Patented July 16, 1929.

1,720,747

UNITED STATES PATENT OFFICE.

FRANK LOUIS ROMAN, OF CHICAGO, ILLINOIS, ASSIGNOR TO WESTERN ELECTRIC COMPANY, INCORPORATED, OF NEW YORK, N. Y., A CORPORATION OF NEW YORK.

WATERPROOF AND FLAMEPROOF MATERIAL.

No Drawing. Application filed July 31, 1926. Serial No. 126,337.

This invention relates to waterproof and flameproof materials, and has for its objects the provision of efficient and inexpensive solutions for rendering materials waterproof and flameproof.

In accordance with the general features of the invention an ammoniacal solution of rubber latex in which is mixed a flameproofing agent such as triammonium phosphate or sodium silicate, and a vulcanizing agent, such as ammonium polysulphide or sulphur, is applied to the material to be treated and the latex is vulcanized thereon. A waterproof film of the vulcanized latex is thereby formed upon the material throughout which the flameproofing agent is uniformly distributed and the material is thereby rendered water and flameproof.

Although the improved solution and method may be employed to treat various materials which it is desirable to render water and flameproof, they are especially applicable to treating textile fabrics and in the following description the invention will be described as applied to such fabrics, it being understood that other materials may be substituted for the fabric without departing from the scope of the invention.

In carrying out the invention, in one embodiment thereof, a textile fabric, such as a cotton cloth, is treated with a solution comprising ammoniacal rubber latex solution, a solution of a flameproofing agent such as triammonium phosphate, and a vulcanizing material such as ammonium polysulphide, and the coated fabric is placed in a closed container which is subjected in any suitable manner to the usual heat and pressure conditions employed in vulcanization of rubber. The water and free ammonia in the solution will be driven off by the heat and the rubber latex will be vulcanized thereby directly upon the fabric. The flameproofing agent will be retained in the film of vulcanized latex and will be uniformly distributed throughout the film in sufficient quantity to render the fabric substantially non-inflammable.

A composition which has proven satisfactory may consist of the following ingredients:

75 parts ammoniacal rubber latex solution containing about 30% rubber 300 parts triammonium phosphate solution of about 25% strength, and 1 part ammonium polysulphide.

Another composition which also gives satisfactory results consists of the following ingredients:

200 parts ammoniacal rubber latex solution containing about 30% rubber 100 parts sodium silicate of a constituency of about 1.42° Bé. and 3 parts ammonium polysulphide or 2 parts sulphur.

By using a composition consisting of the above ingredients, it is possible to render a fabric waterproof to the extent that water will not soak through the textile and which is substantially non-inflammable. The proportions of the ingredients can be varied over a rather wide range, depending on the degrees of waterproofness and flameproofness desired without departing from the scope of the invention. With the same ingredients the higher the flameproofness the lower the waterproofness and pliability and vice versa. Soluble phosphates other than triammonium phosphate, having an alkaline reaction may be used, among them being trisodium phosphate, tripotassium phosphate, disodium ammonium phosphate and disodiumhydrogen phosphate. Also other vulcanizing agents, such as sulphur chloride, may be used instead of the sulphur or ammonium polysulphide if desired and accelerators may be added to shorten the time required for vulcanizing the latex.

What is claimed is:

A waterproofing and flameproofing composition comprising 75 parts ammoniacal rubber latex solution containing about 30% rubber, 300 parts triammonium phosphate solution of about 25% strength, and 1 part ammonium polysulphide.

In witness whereof, I hereunto subscribe my name this 22 day of July A. D., 1926.

FRANK LOUIS ROMAN.